United States Patent
Sondermann et al.

(10) Patent No.: US 9,827,830 B2
(45) Date of Patent: Nov. 28, 2017

(54) REFRIGERANT CIRCUIT FOR A VEHICLE AIR-CONDITIONING SYSTEM AND METHOD OF AIR-CONDITIONING A VEHICLE INTERIOR

(71) Applicant: VALEO KLIMASYSTEME GMBH, Bad Rodach (DE)

(72) Inventors: Mark Sondermann, Weitramsdorf (DE); Roland Haussmann, Wiesloch (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 242 days.

(21) Appl. No.: 14/647,008

(22) PCT Filed: Nov. 26, 2013

(86) PCT No.: PCT/EP2013/074727
§ 371 (c)(1),
(2) Date: May 22, 2015

(87) PCT Pub. No.: WO2014/082994
PCT Pub. Date: Jun. 5, 2014

(65) Prior Publication Data
US 2015/0360543 A1 Dec. 17, 2015

(30) Foreign Application Priority Data
Nov. 27, 2012 (DE) .................. 10 2012 111 455

(51) Int. Cl.
*F25B 1/00* (2006.01)
*F25B 5/00* (2006.01)
(Continued)

(52) U.S. Cl.
CPC ....... *B60H 1/3204* (2013.01); *B60H 1/00392* (2013.01); *B60H 1/00914* (2013.01);
(Continued)

(58) Field of Classification Search
CPC ............ B60H 1/00392; B60H 1/00914; B60H 1/00921; B60H 1/3223; B60H 1/3204;
(Continued)

(56) References Cited

U.S. PATENT DOCUMENTS

| | | | |
|---|---|---|---|
| 6,945,074 B2 * | 9/2005 | Sato ......................... | F25B 6/00 62/228.5 |
| 2006/0042285 A1 * | 3/2006 | Heberle ................. | B60H 1/322 62/236 |

(Continued)

FOREIGN PATENT DOCUMENTS

| | | |
|---|---|---|
| DE | 103 13 850 A1 | 10/2004 |
| DE | 10 2011 015151 A1 | 5/2012 |

(Continued)

OTHER PUBLICATIONS

International Search Report issued in PCT/EP2013/074727 dated Feb. 4, 2014 (3 pages).

*Primary Examiner* — Joseph Trpisovsky
(74) *Attorney, Agent, or Firm* — Osha Liang LLP

(57) ABSTRACT

The invention relates to a refrigerant circuit (10) of a vehicle air-conditioning system (12), in particular for electric vehicles, comprising a compressor unit (14) which includes a first compressor (16) and a second compressor (18) arranged downstream for compressing a refrigerant (20), a condenser (22) for heating air (24) which can be supplied to a vehicle interior, a first pressure reducing unit (26) arranged downstream of the condenser (22) for decompressing the refrigerant (20) from the condenser (22), a heat exchanger (28) through which refrigerant flows for heat exchange with vehicle ambient air (30), an evaporator (32) for cooling air (24) which can be supplied to a vehicle interior, and a second pressure reducing unit (34) arranged upstream of the evaporator (32) for decompressing the refrigerant (20) from the heat exchanger (28), the second compressor (18), the con- (Continued)

denser (22) and the first pressure reducing unit (26) being bypassed in a cooling mode of the vehicle air-conditioning system (12), and the evaporator (32) and the second pressure reducing unit (34) being bypassed in a heating mode of the vehicle air-conditioning system (12). The invention furthermore relates to a method of air-conditioning a vehicle interior, in particular by means of the refrigerant circuit (10) described above.

15 Claims, 3 Drawing Sheets

(51) Int. Cl.
| | | |
|---|---|---|
| F25B 41/00 | (2006.01) | |
| F25B 13/00 | (2006.01) | |
| B60H 1/32 | (2006.01) | |
| B60H 1/00 | (2006.01) | |
| F25B 1/10 | (2006.01) | |

(52) U.S. Cl.
CPC ......... *B60H 1/00921* (2013.01); *B60H 1/323* (2013.01); *B60H 1/3223* (2013.01); *F25B 1/10* (2013.01); *F25B 2341/0662* (2013.01); *F25B 2500/01* (2013.01)

(58) Field of Classification Search
CPC ....... B60H 1/3216; B60H 1/3222; F25B 1/10; F25B 2341/0662; F25B 2500/01; F25B 30/02
USPC ............ 62/115, 117, 196.1–196.4, 199, 215, 62/228.1, 228.5, 324.6, 510
See application file for complete search history.

(56) References Cited

U.S. PATENT DOCUMENTS

| | | | |
|---|---|---|---|
| 2012/0011866 A1* | 1/2012 | Scarcella | ................... F25B 1/10 62/79 |
| 2012/0255319 A1* | 10/2012 | Itoh | ....................... F24F 3/1405 62/160 |

FOREIGN PATENT DOCUMENTS

| | | |
|---|---|---|
| FR | 2 963 665 A1 | 2/2012 |
| JP | 2007-263390 A | 10/2007 |
| JP | 2012-132586 A | 7/2012 |
| WO | 2009/082405 A1 | 7/2009 |

* cited by examiner

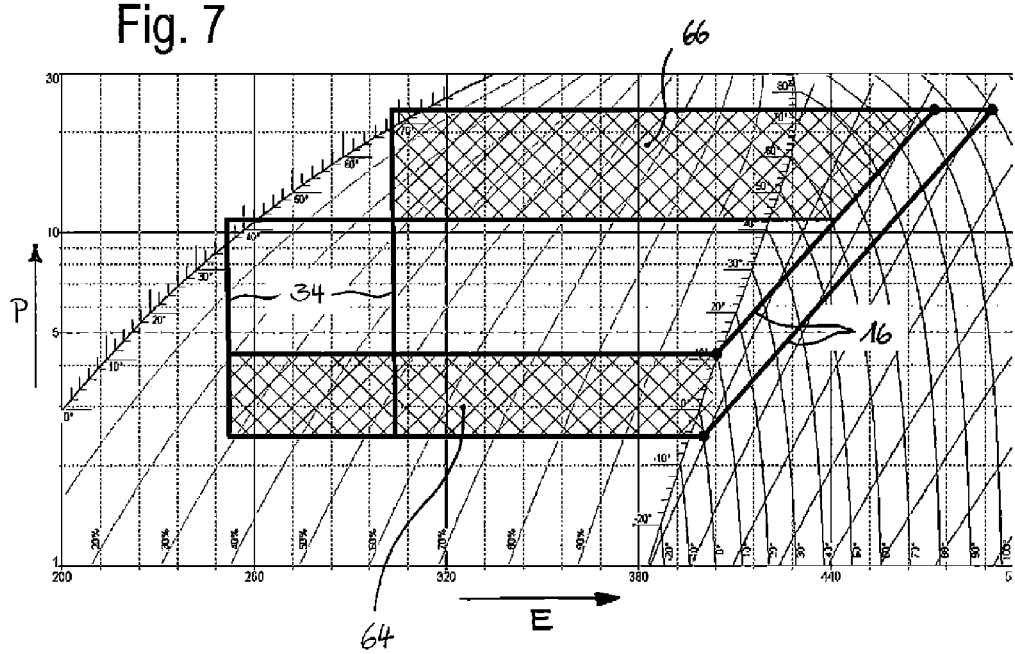
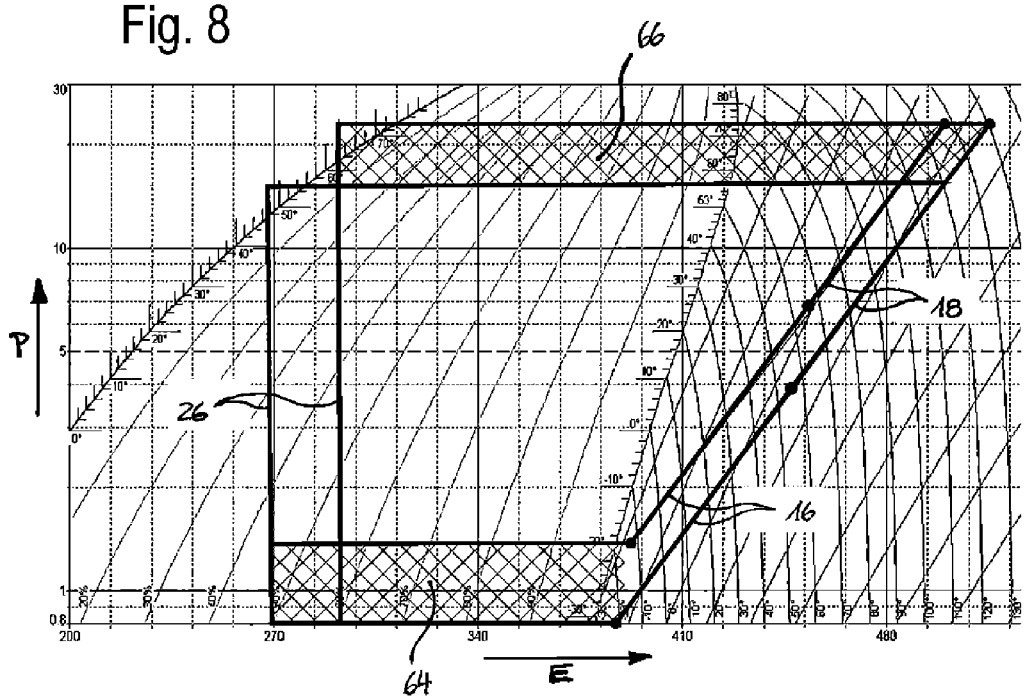

REFRIGERANT CIRCUIT FOR A VEHICLE AIR-CONDITIONING SYSTEM AND METHOD OF AIR-CONDITIONING A VEHICLE INTERIOR

The invention relates to a refrigerant circuit of a vehicle air-conditioning system, in particular for electric vehicles, and to a method of air-conditioning a vehicle interior, in particular by means of such a refrigerant circuit.

Modern motor vehicles are nowadays usually equipped with an air-conditioning system for air-conditioning the vehicle interior. These vehicle air-conditioning systems are predominantly operated with a refrigerant circuit based on the Carnot principle, in order to achieve cooling of the vehicle interior when there are high external temperatures. To heat the vehicle interior when the external temperatures are low, use is usually made of the waste heat from the internal combustion engine of the motor vehicle.

In the case of electric vehicles as a whole, and during a warm-up phase in the case of motor vehicles with an internal combustion engine, the waste heat from the vehicle engine is so small, however, that satisfactory heating of the vehicle interior is not possible. For this reason, use is often made of an additional, electric heating appliance, which, however, is associated with a very high energy consumption and also an additional need for installation space and additional appliance costs.

In order to improve the heating of the vehicle interior, it has already been proposed in the prior art to operate the vehicle air-conditioning system present for cooling the vehicle interior as a heat pump when required, and to therefore utilize the outside air as a heat source for heating the vehicle interior.

Thus, DE 103 13 850 A1 addressed the object of providing an apparatus for efficiently cooling and heating motor vehicles which operates specifically with carbon dioxide as the refrigerant and is adapted to the characteristics of this refrigerant and also to combined heat pump and refrigeration unit operation with two-stage compression. Said document proposes a refrigerant circuit and a method for combined refrigeration unit and heat pump operation of the refrigerant circuit with two-stage compression, in which the refrigerant releases heat energy after the second compression stage. In refrigeration unit operation, the refrigerant is expanded to evaporation pressure, then absorbs heat and is compressed in a first compression stage. This is followed by intermediate cooling, before the refrigerant is supplied to a second compression stage. In contrast, there is no intermediate cooling of the refrigerant after the first compression stage in heat pump operation.

It is an object of the invention to provide a refrigerant circuit of a vehicle air-conditioning system and a method of air-conditioning a vehicle interior with which the air-conditioning system can be operated as a refrigeration machine and heat pump in a particularly energy-saving manner.

This object is achieved according to the invention by a refrigerant circuit of a vehicle air-conditioning system, comprising a compressor unit which includes a first compressor and a second compressor arranged downstream for compressing a refrigerant, a condenser for heating air which can be supplied to a vehicle interior, a first pressure reducing unit arranged downstream of the condenser for decompressing the refrigerant from the condenser, a heat exchanger through which refrigerant flows for heat exchange with vehicle ambient air, an evaporator for cooling air which can be supplied to a vehicle interior, and a second pressure reducing unit arranged upstream of the evaporator for decompressing the refrigerant from the heat exchanger, the second compressor, the condenser and the first pressure reducing unit being bypassed in a cooling mode of the vehicle air-conditioning system, and the evaporator and the second pressure reducing unit being bypassed in a heating mode of the vehicle air-conditioning system. This refrigerant circuit makes it possible to specifically tune the first compressor to the cooling mode of the air-conditioning system and also to specifically tune the second compressor to a heating mode of the air-conditioning system. In the cooling mode, the second compressor is shut off, such that the air-conditioning system cools the vehicle interior in an energy-efficient manner exclusively with the first compressor. In order to ensure satisfactory heating of the vehicle interior, particularly in cold weather, a relatively high compressor power and a relatively high pressure ratio are needed in the heating mode, which is why a second compressor stage is activated. This second compressor is tuned specifically to the heating mode, and therefore, together with the first compressor, it makes an energy-efficient heating operation of the vehicle air-conditioning system possible.

In one embodiment of the refrigerant circuit, the throughflow of the refrigerant is controlled by the provision of a directional valve, which assumes a first switching position in the cooling mode and a second switching position in the heating mode. In certain circumstances, provision can also additionally be made of shut-off and/or non-return valves, in order to align the throughflow in the refrigerant circuit specifically with the requirements in the cooling mode and heating mode.

It is preferable that the first pressure reducing unit and/or the second pressure reducing unit is an expansion valve with a shut-off function. This makes it possible to minimize the number of individual components in the refrigerant circuit and to advantageously control the throughflow with the aid of said specific expansion valves. Alternatively, it is also conceivable to use prefabricated assemblies of an expansion valve and a shut-off valve as a pressure reducing unit.

In a further embodiment of the refrigerant circuit, an operating pressure and/or a delivered quantity of the first compressor can be controlled, preferably can be controlled in a continuously variable manner. The power of the first compressor can therefore be adapted to the respective marginal conditions without any problems, which leads to a particularly energy-efficient operation of the vehicle air-conditioning system both in the cooling mode and in the heating mode.

By contrast, it is possible for example for an operating pressure and/or a delivered quantity of the second compressor to be substantially constant. The second compressor is thus a simple and inexpensive component with a fixedly predetermined rated power and can simply be switched on or switched off. Since the second compressor is only activated when required, energy-efficient power adaptation of the compressor unit as a whole in the heating mode can be effected in particular by the first compressor. The first compressor is, for example, a conventional air-conditioning compressor, optimized for the cooling mode, whereas the second compressor is, for example, a simple additional compressor optimized for the heating mode. Consequently, the compressor unit in this case comprises two separate compressors in separate compressor housings. If the second compressor is to have a certain degree of power control given low costs and a small manufacturing outlay, it is alternatively conceivable that the second compressor can merely be controlled in stages, i.e. has for example two or three power stages.

In a further embodiment of the refrigerant circuit, at least one electric motor is provided for driving the first compressor and/or the second compressor.

In particular, precisely one electric motor can be provided for driving both compressors. This reduces the outlay on manufacturing and assembly and thus lowers the cost of the vehicle air-conditioning system.

In this case, it is preferable that the first compressor and the second compressor have a common drive shaft. The compressors are therefore, for example, scroll compressors or rotary piston compressors which can be adapted to a desired swept volume and/or pressure ratio by different compression geometries. The two compressors can in this case also be referred to as the first and second stages of a single compressor, and are preferably accommodated in a common compressor housing.

In particular, provision can be made of a coupling, by which the second compressor can be coupled to the electric motor or uncoupled from the electric motor. If merely a single electric motor is provided as a drive for the two compressors, the second compressor can be activated or deactivated as required with little expenditure by way of the coupling. This makes a particularly energy-efficient operation of the air-conditioning system possible.

In a further embodiment of the refrigerant circuit, each compressor has a refrigerant swept volume, the swept volume of the second compressor being approximately 20-50% of the swept volume of the first compressor. The lower swept volume of the second compressor takes account of the fact that the refrigerant has already been precompressed by the first compressor when it enters into the second compressor. Consequently, the swept volume of the second compressor can be reduced without losses in power, giving rise to the advantage of a reduced need for installation space and energy for the second compressor.

Moreover, each compressor has a maximum pressure ratio, the maximum pressure ratio of the second compressor preferably being approximately 30-50% of the maximum pressure ratio of the first compressor. Particularly in conjunction with the lower swept volume, the second compressor can be designed, as a result of the lower pressure ratio, as a simple and inexpensive "cut-in compressor", which is designed not for independent operation of the vehicle air-conditioning system, but rather merely for support operation for the first compressor.

In one embodiment variant of the refrigerant circuit, on the suction side, provision is made of a refrigerant reservoir, which is arranged downstream of the second pressure reducing unit in the cooling mode and downstream of the first pressure reducing unit in the heating mode.

In an alternative embodiment of the refrigerant circuit, on the pressure side, provision is made of a refrigerant reservoir, which is arranged upstream of the second pressure reducing unit in the cooling mode and upstream of the first pressure reducing unit in the heating mode.

The refrigerant circuit furthermore has a low-pressure section downstream of the first or second pressure reducing unit up to a suction side of the first compressor and a high-pressure section upstream of the first or second pressure reducing unit up to a pressure side of the first compressor, it being possible for the low-pressure section and the high-pressure section to be formed at least in certain regions as an internal heat exchanger. The refrigerant in the high-pressure section in this case releases heat energy to the refrigerant in the low-pressure section by way of the internal heat exchanger, which leads to an increased efficiency of the vehicle air-conditioning system.

The object set in the introduction is moreover also achieved by a method of air-conditioning a vehicle interior by means of a refrigerant circuit of a vehicle air-conditioning system, for example by means of the refrigerant circuit described above, in which the refrigerant, in a heating mode of the vehicle air-conditioning system, flows through a condenser for heating air which can be supplied to a vehicle interior, a first pressure reducing unit arranged downstream and the heat exchanger acting as an evaporator for heat exchange with vehicle ambient air, and, in a cooling mode of the vehicle air-conditioning system, flows through an evaporator for cooling air which can be supplied to a vehicle interior, a second pressure reducing unit arranged upstream and a heat exchanger acting as a condenser for heat exchange with vehicle ambient air, the refrigerant being compressed exclusively by a first compressor in the cooling mode and by the first compressor and also additionally by a second compressor, arranged downstream, in the heating mode.

Similarly to conventional air-conditioning systems, which are operated exclusively as a refrigeration machine, in the cooling mode use is made merely of a compressor optimized for the cooling mode, and therefore the vehicle air-conditioning system does not have an increased energy demand during operation as a refrigeration machine. A second compressor is activated merely during operation as a heat pump, in order to achieve a satisfactory heating power even when the external temperatures are low. Here, the efficiency of the air-conditioning system in heat pump operation is generally higher, usually even considerably higher, than the efficiency of an electric heating appliance. In other words, this means that an electrical energy demand of the compressor unit is lower than the electrical energy demand of an electric heating appliance for achieving a comparable heating power. The method presented as a whole therefore gives rise to an extremely energy-efficient air-conditioning of the vehicle interior with low additional outlay in terms of design and method.

Further features and advantages of the invention will become apparent from the following description of preferred embodiments with reference to the drawings, in which:

FIG. 7 shows a Mollier diagram illustrating the changes in state of the refrigerant in the cooling mode of the vehicle air-conditioning system; and FIG. 8 shows a Mollier diagram illustrating the changes in state of the refrigerant in the heating mode of the vehicle air-conditioning system.

Figure 1:
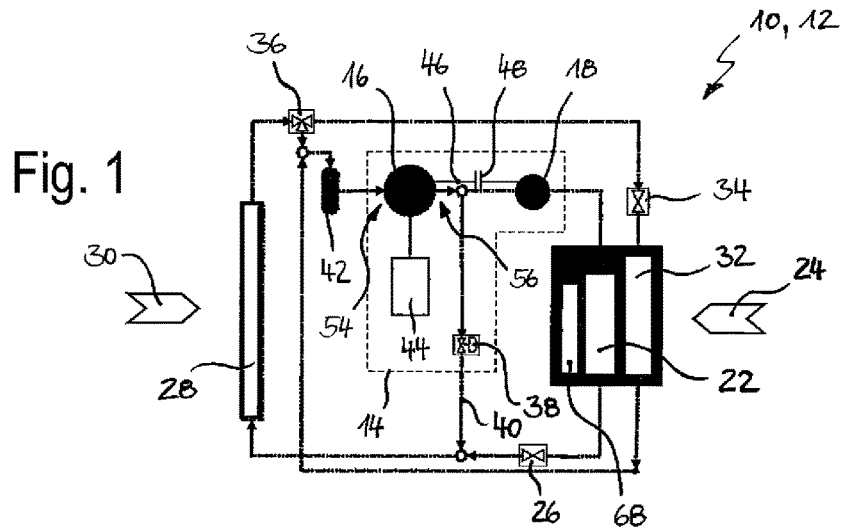
FIG. 1 shows a schematic plan of a refrigerant circuit according to the invention of a vehicle air-conditioning system according to a first embodiment.

FIG. 1 shows a refrigerant circuit 10 of a vehicle air-conditioning system 12, in particular for electric vehicles, comprising a compressor unit 14 which includes a first compressor 16 and a second compressor 18 arranged downstream for compressing a refrigerant 20, a condenser 22 for cooling and condensing the refrigerant 20 from the compressor unit 14 and for heating air 24 which can be supplied to a vehicle interior, a first pressure reducing unit 26 arranged downstream of the condenser 22 for decompressing the refrigerant 20 from the condenser 22, a heat exchanger through which refrigerant flows for heat exchange with vehicle ambient air 30 and optionally for cooling and condensing or heating and evaporating the refrigerant 20, an evaporator 32 for heating and evaporating the refrigerant 20 and for cooling air 24 which can be supplied to a vehicle interior, and a second pressure reducing unit 34 arranged upstream of the evaporator 32 for decompressing the refrigerant 20 from the heat exchanger 28.

Figure 2:
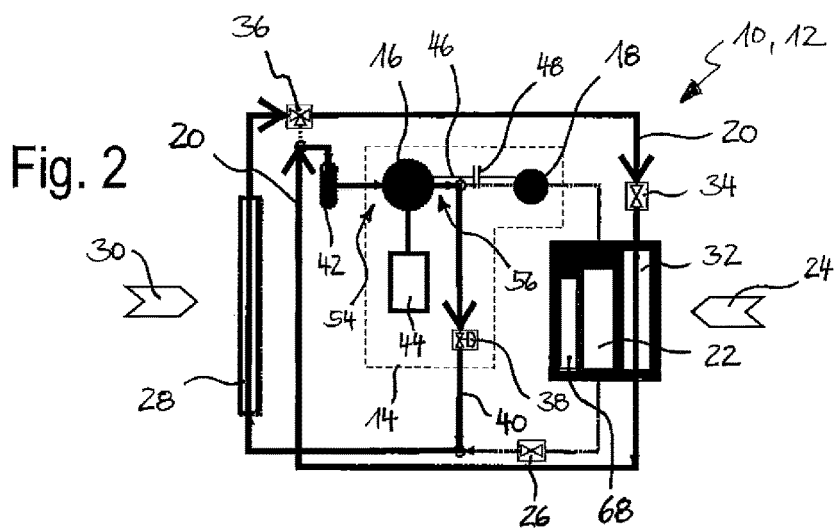
FIG. 2 shows the schematic plan of the refrigerant circuit shown in FIG. 1 in a cooling mode of the vehicle air-conditioning system.
Figure 3:
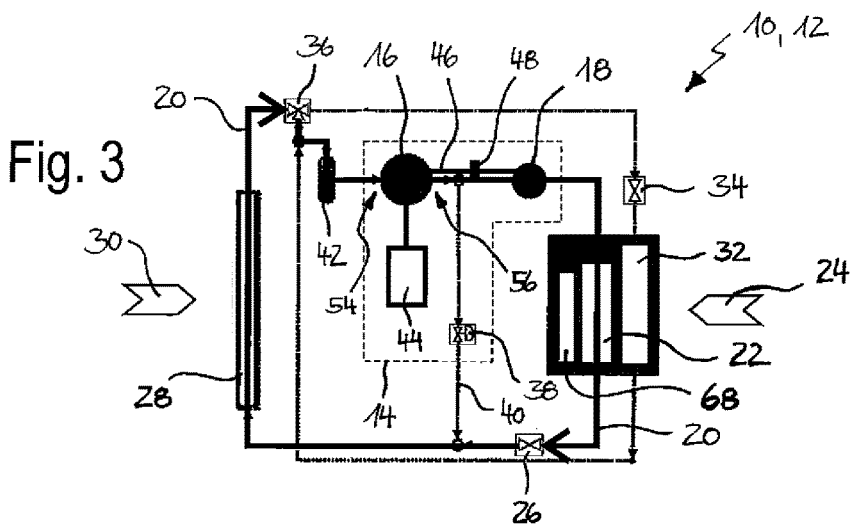
FIG. 3 shows the schematic plan of the refrigerant circuit shown in FIG. 1 in a heating mode of the vehicle air-conditioning system.

To control the throughflow of the refrigerant 20, the refrigerant circuit 10 further comprises a directional valve 36, to be precise a 3/2-way valve, which assumes a first switching position in a cooling mode of the vehicle air-conditioning system 12 and a second switching position in a heating mode of the vehicle air-conditioning system 12 (see also FIGS. 2 and 3).

Moreover, provision is made of a shut-off valve 38, which can optionally enable or block a throughflow of refrigerant in a fluid line 40 of the refrigerant circuit 10.

In the example shown in FIG. 1, the two pressure reducing units 26, 34 are each in the form of an expansion valve with a shut-off function. Alternatively, it is also conceivable that a prefabricated assembly of an expansion valve and a shut-off valve is used in each case as the pressure reducing unit 26, 34. In this way, the pressure reducing units 26, 34 can also be used to control the throughflow of the refrigerant 20, and therefore it is possible to dispense with additional throughflow control elements, for example further separate shut-off valves or non-return valves.

FIG. 2 illustrates the flow of the refrigerant 20 through the refrigerant circuit 10 in a cooling mode of the vehicle air-conditioning system 12. It becomes clear that the second compressor 18, the condenser 22 and the first pressure reducing unit 26 are bypassed in this cooling mode. For this purpose, the shut-off valve 38, formed for example as a solenoid valve, is opened, whereas the first pressure reducing unit 26 assumes a closed position, in which a flow of refrigerant through the expansion valve is blocked.

In the cooling mode, the directional valve 36 assumes its first switching position, in which it connects the heat exchanger 28 acting as a condenser to the second pressure reducing unit 34.

FIG. 3 illustrates the flow of the refrigerant 20 through the refrigerant circuit 10 in a heating mode of the vehicle air-conditioning system 12. It becomes clear that the evaporator 32 and the second pressure reducing unit 34 are bypassed in this heating mode. For this purpose, the shut-off valve 38 is closed, so that no refrigerant 20 can flow through the fluid line 40.

In the heating mode of the vehicle air-conditioning system 12, the directional valve 36 assumes its second switching position, in which it connects the heat exchanger 28 now acting as an evaporator to the first compressor 16 of the compressor unit 14 via a refrigerant reservoir 42.

If the second pressure reducing unit 34 has a shut-off function, the second pressure reducing unit 34 can assume its closed position in the heating mode, in which it blocks a flow of refrigerant through the expansion valve.

The method of air-conditioning the vehicle interior becomes clear with reference to the refrigerant circuits 10 of the vehicle air-conditioning system 12 as shown in FIGS. 2 and 3.

In the cooling mode of the vehicle air-conditioning system 12, the refrigerant 20 flows through the evaporator 32 for cooling air 24 which can be supplied to the vehicle interior, the second pressure reducing unit 34 arranged upstream and the heat exchanger 28 acting as a condenser for heat exchange with the vehicle ambient air 30.

In the heating mode of the vehicle air-conditioning system 12, by contrast, the refrigerant 20 flows through the condenser 22 for heating air 24 which can be supplied to the vehicle interior, the first pressure reducing unit 26 arranged downstream and the heat exchanger 28 acting as an evaporator for heat exchange with the vehicle ambient air 30.

In this case, the refrigerant 20 is compressed exclusively by the first compressor 16 of the compressor unit 14 in the cooling mode and by the first compressor 16 and additionally by the second compressor 18, arranged downstream, of the compressor unit 14 in the heating mode of the vehicle air-conditioning system 12.

In the cooling mode, this gives rise to an energy-saving operation of the vehicle air-conditioning system 12, with merely a first compressor 16, tuned specifically to the cooling mode, analogously to conventional air-conditioning systems, which are operated exclusively as a refrigeration machine.

Furthermore, the refrigerant circuit 10 also makes it possible to operate the vehicle air-conditioning system 12 as a heat pump in an extremely energy-saving manner, a second compressor 18 tuned specifically to the heating mode of the air-conditioning system being activated in order to increase the overall compressor power. Satisfactory heating of the vehicle interior is therefore possible even if the vehicle ambient air 30 is very cold.

In the example shown in FIG. 1, an operating pressure and/or a delivered quantity of the first compressor 16 can be controlled, preferably can be controlled in a continuously variable manner. Since the first compressor 16 is in operation both in the cooling mode and in the heating mode, the compressor power can in both cases be adapted to the respective marginal conditions and desired air-conditioning by means of appropriate activation of the first compressor 16, and therefore a particularly energy-efficient operation of the vehicle air-conditioning system 12 is possible.

By contrast, an operating pressure and/or a delivered quantity of the second compressor 18 can be substantially constant. The second compressor 18 is merely activated in the heating mode in order to be able to provide a higher compressor power. Should an increased overall compressor power not be necessary, this can be adapted without any problems by way of the activation of the first compressor 16. Consequently, despite the simple and inexpensive embodiment of the second compressor 18, an extremely energy-efficient operation of the vehicle air-conditioning system 12 is also ensured in the heating mode. By way of example, the first compressor 16 is a conventional air-conditioning compressor optimized for the cooling mode. By contrast, the second compressor 18 can be a simple additional compressor optimized for the heating mode. In this case, the compressor unit 14 therefore comprises two separate compressors 16, 18 each accommodated in separate compressor housings and each driven by an electric motor 44.

In the example shown in FIGS. 1 to 3, however, provision is made of only one electric motor 44, which can drive both the first compressor 16 and the second compressor 18.

In this case, the two compressors 16, 18 have a common drive shaft 46, provision being made of a coupling 48 by which the second compressor 18 can be coupled to the electric motor 44 or uncoupled from the electric motor 44.

The first compressor 16 and the second compressor 18 are, for example, scroll or rotary piston compressors, which can be adapted to a desired swept volume and/or pressure ratio by different compression geometries. In this case, the two compressors 16, 18 can also be referred to as the first and second stages of a single compressor, and can be accommodated in a common compressor housing.

In the examples shown, the two compressors 16, 18 and the electric motor 44 together with the drive shaft 46 and the coupling 48 are configured as a compact and pre-mountable assembly which can be installed in the refrigerant circuit 10 or interchanged with little expenditure.

As shown in FIGS. 1 to 3, the shut-off valve 38 of the fluid line 40 is also integrated in this compressor unit 14 configured as an assembly, in order to further reduce the number of individual components of the refrigerant circuit 10 and also the installation space required.

In a particularly inexpensive embodiment of the vehicle air-conditioning system 12, the coupling 48 is configured as a simple mechanical assembly which can establish or release the mechanical coupling between the second compressor 18 and the first compressor 16 or between the second compressor 18 and the electric motor 444 only during stoppage of the compressor unit 14. Since such coupling or uncoupling of the second compressor 18 only has to be carried out when changing between heating mode and cooling mode, brief stoppage of the drive shaft 46 for opening or closing the coupling 48 can be realized without relatively great losses in convenience.

Alternatively, it is of course also conceivable to use a coupling which makes it possible to couple or uncouple the second compressor 18 even when the drive shaft 46 is rotating.

The two compressors 16, 18 each have a refrigerant swept volume, the swept volume of the second compressor being approximately 20-50% of the swept volume of the first compressor 16. Since the refrigerant 20 has already experienced a certain degree of precompression by the first compressor 16 when it flows into the second compressor 18, the swept volume of the second compressor 18 can be reduced compared to the swept volume of the first compressor 16 without any losses in power, which leads to a more compact and less expensive construction of the compressor unit 14.

Furthermore, both compressors 16, 18 each have a maximum pressure ratio, the maximum pressure ratio of the second compressor 18 being approximately 30-50% of the maximum pressure ratio of the first compressor 16. Owing to a reduced swept volume and maximum pressure ratio compared to the first compressor 16, the second compressor 18 can be produced as a particularly simple and inexpensive additional compressor.

In order, for example, to achieve a desired air outlet temperature into the vehicle interior of approximately 50° C., with a low external temperature of approximately −20° C., a powerful evaporator gives rise to an evaporation temperature of approximately −26° C. (corresponds to a refrigerant pressure of approximately 1 bar) and a condensation temperature of approximately 58° C. (corresponds to a refrigerant pressure of approximately 16 bar). In this case, it has been found to be particularly advantageous if the first compressor compresses the refrigerant 20 from the initial pressure of 1 bar to approximately 6-7 bar and the second compressor 18, proceeding from this intermediate pressure, carries out a further compression of the refrigerant 20 to the desired end pressure of approximately 16 bar. The maximum pressure ratio of the second compressor 18 is then approximately 33-44% of the maximum pressure ratio of the first compressor 16.

FIGS. 1 to 3 show the refrigerant circuit 10 of the vehicle air-conditioning system 12 according to a first embodiment, in which, on the suction side, provision is made of a refrigerant reservoir 42, which is arranged downstream of the second pressure reducing unit 34 in the cooling mode and downstream of the first pressure reducing unit 26 in the heating mode. This refrigerant reservoir 42 is accordingly a low-pressure reservoir, from which preferably exclusively gaseous refrigerant 20 is taken in order to supply it to the compressor unit 14.

In the cooling mode, after compression by the first compressor 16, the refrigerant 20 is then supplied to the heat exchanger 28 acting as a condenser, in which the refrigerant 20 cools and condenses with heating of the ambient air 30. The now liquid refrigerant 20 is then conducted via the directional valve 36 and the second pressure reducing unit 34 to the evaporator 32, in which the refrigerant 20 cools the air 24 which can be supplied to the vehicle interior and in the process is itself heated and evaporated, in order to then flow back to the refrigerant reservoir 42 again.

In the heating mode, the refrigerant 20 is compressed by both compressors 16, 18 and supplied to the condenser 22, in which the refrigerant 20 heats up the air 24 which can be supplied to the vehicle interior and in the process itself cools and condenses. The now liquid refrigerant 20 then flows through the first pressure reducing unit 26 and passes into the heat exchanger 28 now acting as an evaporator, in which the refrigerant 20 cools the vehicle ambient air 30 and in the process is itself heated and evaporated. The substantially gaseous refrigerant 20 then passes back into the refrigerant reservoir 42 again via the directional valve 36.

Figure 4:
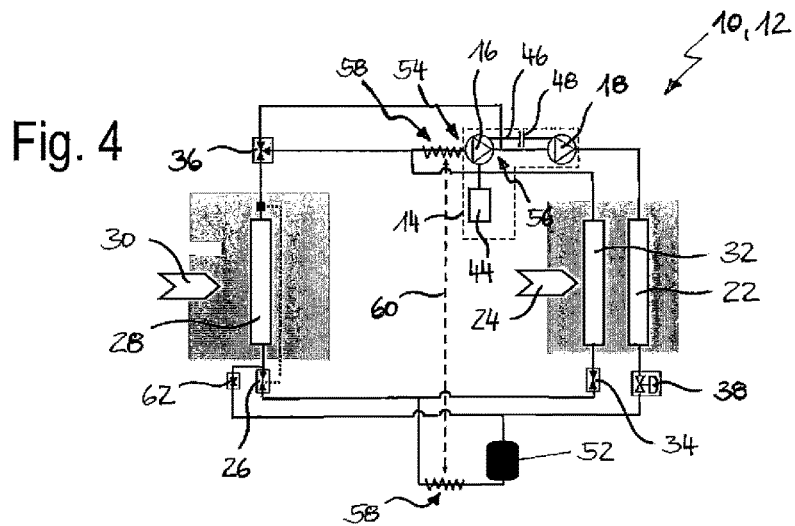
FIG. 4 shows a schematic plan of a refrigerant circuit according to the invention of a vehicle air-conditioning system according to a second embodiment.
Figure 5:
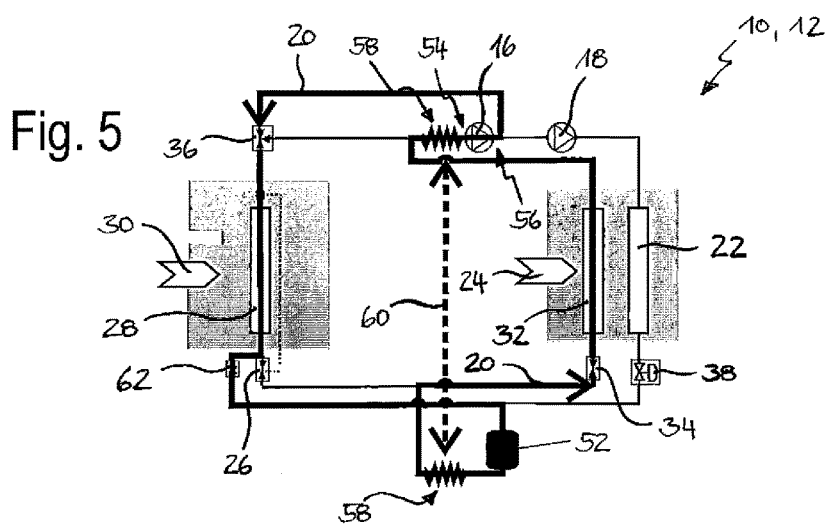
FIG. 5 shows the schematic plan of the refrigerant circuit shown in FIG. 4 in a cooling mode of the vehicle air-conditioning system.
Figure 6:
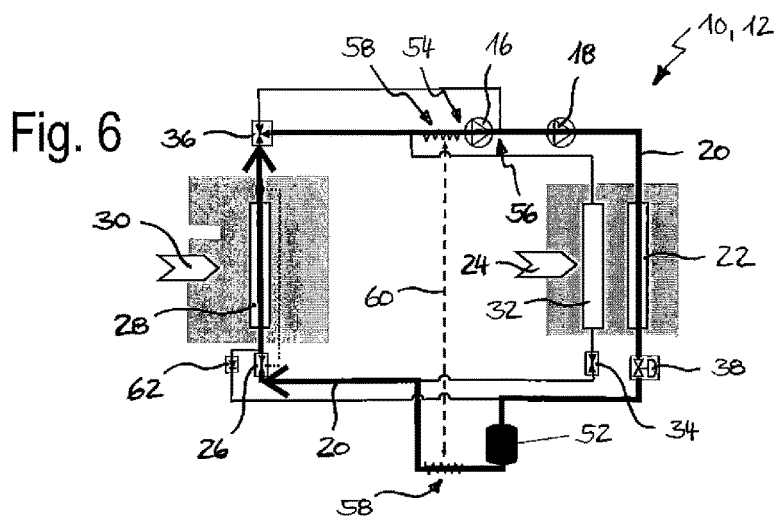
FIG. 6 shows the schematic plan of the refrigerant circuit shown in FIG. 4 in a heating mode of the vehicle air-conditioning system.

FIGS. 4 to 6 show the refrigerant circuit 10 according to a second embodiment, which, in terms of the basic design and operation, corresponds largely to the first embodiment of the refrigerant circuit 10 as shown in FIGS. 1 to 3. In order to avoid repetitions, reference is therefore explicitly made to the above description of FIGS. 1 to 3, and hereinbelow only differences between the embodiments are explained.

In contrast to the first embodiment, in FIGS. 4 to 6, on the pressure side, provision is made of a refrigerant reservoir 52, which is arranged upstream of the second pressure reducing unit 34 in the cooling mode and upstream of the first pressure reducing unit 26 in the heating mode. The refrigerant reservoir 52 is accordingly a high-pressure reservoir, from which preferably exclusively liquid refrigerant 20 is taken in order to conduct it via the second pressure reducing unit 34 to the evaporator 32 in the cooling mode and via the first pressure reducing unit 26 to the heat exchanger 28 acting as an evaporator in the heating mode.

The refrigerant circuit 10 has a low-pressure section downstream of the first or second pressure reducing unit 26, 34 up to a suction side 54 of the first compressor 16 and a high-pressure section upstream of the first or second pressure reducing unit 26, 34 up to a pressure side 56 of the first compressor 16, the low-pressure section and the high-pressure section being formed at least in certain regions as an internal heat exchanger 58. Heat exchange between the regions of the refrigerant circuit 10 which are formed as an internal heat exchanger 58 is denoted in FIGS. 4 to 6 by a dashed double-headed arrow 60, the two regions being shown at a distance from one another merely for reasons of clarity, even though in a real refrigerant circuit 10 they are located so close to one another that good heat transfer is possible.

Whereas the function of the internal heat exchanger 58 is rather negligible in the heating mode as shown in FIG. 6, the efficiency of the vehicle air-conditioning system 12 is increased considerably in the cooling mode as shown in FIG. 5, since the refrigerant 20 in the high-pressure section transfers heat energy to the refrigerant 20 in the low-pressure section.

It goes without saying that the integration of an internal heat exchanger 58 for improving the efficiency of the vehicle air-conditioning system 12 is not limited to specific embodiments of the refrigerant circuit 10. Thus, the internal heat exchanger 58 can also be used in particular in refrigerant circuits 10 as shown in FIGS. 1 to 3.

In the second embodiment of the refrigerant circuit 10 as shown in FIGS. 4 to 6, provision is furthermore made of a non-return valve 62, which is arranged downstream of the heat exchanger 28 and upstream of the refrigerant reservoir 52 in the cooling mode. In the cooling mode as shown in FIG. 5, the non-return valve 62 therefore makes it possible for refrigerant to flow from the heat exchanger 28 to the refrigerant reservoir 52, whereas, in the heating mode as shown in FIG. 6, it prevents refrigerant from flowing from the condenser 22 directly to the heat exchanger 28 by bypassing the refrigerant reservoir 52 and the first pressure reducing unit 26.

FIG. 7 shows a Mollier diagram of the refrigerant circuit 10 in the cooling mode of the vehicle air-conditioning system 12, the enthalpy E being plotted logarithmically on the abscissa and a pressure P of the refrigerant 20 being plotted logarithmically on the ordinate. Here, an evaporation range 64, emphasized in cross-hatching, of the refrigerant 20 (here R 134 a) lies at a temperature of approximately 0° C. and a corresponding refrigerant pressure of approximately 3 bar. The refrigerant 20 is then compressed exclusively by the first compressor 16 as far as into a condensation range 66, likewise emphasized in cross-hatching, in which the refrigerant 20 is at a temperature of approximately 65° C. at a pressure of approximately 20 bar. Finally, the refrigerant 20 is expanded at the second pressure reducing unit 34 to such an extent that it lies in the evaporation range 64 again.

FIG. 8 shows a Mollier diagram of the refrigerant circuit 10 in the heating mode of the vehicle air-conditioning system 12, in turn the enthalpy E being plotted logarithmically on the abscissa and the pressure P of the refrigerant 20 being plotted logarithmically on the ordinate. As compared with the cooling mode, the evaporation range 64 and the condensation range 66 lie considerably further apart in the heating mode, and therefore a higher power of the compressor unit 14 is required. For this reason, the second compressor 18 is activated, such that the power of the compressor unit 14 is made up of a power of the first compressor 16 and a power of the second compressor 18.

The refrigerants R 134 a and HFO 1234 yf are suitable in particular as refrigerants 20 for the refrigerant circuit 10 shown in the figures. It goes without saying, however, that other suitable refrigerants 20 can also be used in the refrigerant circuit 10 of the vehicle air-conditioning system 12.

The described refrigerant circuit 10 for vehicle air-conditioning systems 12 and the presented method of air-conditioning a vehicle interior are particularly suitable for electric vehicles, which do not provide significant "engine heat" for heating the vehicle interior. This heating is then effected by way of the above-described heat pump operation of the refrigerant circuit 10 of the vehicle air-conditioning system 12.

Should the refrigerant circuit 10 not be able to provide a sufficient heating power for heating the vehicle interior in heat pump operation under extreme conditions, for example if the vehicle ambient air 30 is at an extremely low temperature, the vehicle air-conditioning system 12 can optionally have an additional heating appliance 68, which is arranged downstream of the condenser 22 in the direction of flow of the air 24. Although the heating appliance 68 is shown merely in the first embodiment of the refrigerant circuit 10 as shown in FIGS. 1 to 3, a heating appliance 68 can of course optionally also be provided in the second embodiment of the refrigerant circuit 10.

It is particularly preferable that the heating appliance 68 is what is termed a PTC heater, the electrical resistance of which changes with the temperature. Therefore, the warmer the air 24 from the condenser 22, the greater the electrical resistance of the PTC heater and the lower the heating power thereof—and vice versa. The heating appliance 68 therefore adjusts its heating power automatically depending on the air temperature, and produces a high heating power given a low air temperature and a low heating power given a high temperature. This in turn contributes to a particularly energy-saving operation of the vehicle air-conditioning system 12.

The invention claimed is:

1. A refrigerant circuit of a vehicle air-conditioning system for electric vehicles, comprising:
    a compressor unit which includes a first compressor and a second compressor arranged downstream for compressing a refrigerant;
    a condenser for heating air that is supplied to a vehicle interior;
    a first pressure reducing unit arranged downstream of the condenser for decompressing the refrigerant from the condenser;
    a heat exchanger through which refrigerant flows for heat exchange with vehicle ambient air;
    an evaporator for cooling air that is supplied to the vehicle interior; and
    a second pressure reducing unit arranged upstream of the evaporator for decompressing the refrigerant from the heat exchanger, the second compressor, the condenser, and the first pressure reducing unit being bypassed in a cooling mode of the vehicle air-conditioning system, and
    the evaporator and the second pressure reducing unit being bypassed in a heating mode of the vehicle air-conditioning system.

2. The refrigerant circuit according to claim 1, wherein the throughflow of the refrigerant is controlled by a directional valve having a first switching position in the cooling mode and a second switching position in the heating mode.

3. The refrigerant circuit according to claim 1, wherein the first pressure reducing unit and/or the second pressure reducing unit is an expansion valve with a shut-off function.

4. The refrigerant circuit according to claim 1, wherein an operating pressure and/or a delivered quantity of the first compressor is controlled.

5. The refrigerant circuit according to claim 1, wherein an operating pressure and/or a delivered quantity of the second compressor is substantially constant.

6. The refrigerant circuit according to claim 1, wherein at least one electric motor is provided for driving the first compressor and/or the second compressor.

7. The refrigerant circuit according to claim 6, wherein precisely one electric motor is provided for driving the first compressor and the second compressor.

8. The refrigerant circuit according to claim 7, wherein the first compressor and the second compressor have a common drive shaft.

9. The refrigerant circuit according to claim 7, wherein the second compressor is coupled to the electric motor or uncoupled from the electric motor by a coupling.

10. The refrigerant circuit according to claim 1, wherein each compressor has a refrigerant swept volume, the swept volume of the second compressor being approximately 20-50% of the swept volume of the first compressor.

11. The refrigerant circuit according to claim 1, wherein each compressor has a maximum pressure ratio, the maximum pressure ratio of the second compressor being approximately 30-50% of the maximum pressure ratio of the first compressor.

12. The refrigerant circuit according to claim 1, wherein, on a suction side, a refrigerant reservoir is arranged downstream of the second pressure reducing unit in the cooling mode and downstream of the first pressure reducing unit in the heating mode.

13. The refrigerant circuit according to claim 1, wherein, on a pressure side, a refrigerant reservoir is arranged upstream of the second pressure reducing unit in the cooling mode and upstream of the first pressure reducing unit in the heating mode.

14. The refrigerant circuit according to claim 1, wherein the refrigerant circuit has a low-pressure section downstream of the first or second pressure reducing unit up to a suction side of the first compressor and a high-pressure section upstream of the first or second pressure reducing unit up to a pressure side of the first compressor, the low-pressure section and the high-pressure section being formed at least in certain regions as an internal heat exchanger.

15. A method of air-conditioning a vehicle interior by a refrigerant circuit of a vehicle air-conditioning system, the method comprising:
   in a heating mode of the vehicle air-conditioning system, flowing a refrigerant through a condenser for heating air supplied to a vehicle interior, wherein a first pressure reducing unit is arranged downstream and a heat exchanger acts as an evaporator for heat exchange with vehicle ambient air; and,
   in a cooling mode of the vehicle air-conditioning system, flowing the refrigerant through an evaporator for cooling air supplied to the vehicle interior, wherein a second pressure reducing unit is arranged upstream and the heat exchanger acts as a condenser for heat exchange with the vehicle ambient air,
   wherein the refrigerant is compressed by a first compressor in the cooling mode, and by the first compressor and a second compressor, arranged downstream, in the heating mode.

* * * * *